(12) United States Patent
Matsueda et al.

(10) Patent No.: US 6,695,212 B2
(45) Date of Patent: Feb. 24, 2004

(54) PRINTED MATERIAL WITH RAILWAY ROUTE CHART PRINTED THEREON, INFORMATION PRESENTING METHOD, INFORMATION PRESENTATION SYSTEM, INFORMATION RESOURCE, AND TICKET ISSUING METHOD

(75) Inventors: Akira Matsueda, Hachioji (JP); Mutsumi Kikuchi, Akishima (JP)

(73) Assignee: Olympus Optical Co., Ltd., Tokyo (JP)

( * ) Notice: Subject to any disclaimer, the term of this patent is extended or adjusted under 35 U.S.C. 154(b) by 428 days.

(21) Appl. No.: 09/873,441

(22) Filed: Jun. 4, 2001

(65) Prior Publication Data

US 2001/0055410 A1 Dec. 27, 2001

(30) Foreign Application Priority Data

Jun. 6, 2000 (JP) .......................................... 2000-169211
Apr. 20, 2001 (JP) .......................................... 2001-123157

(51) Int. Cl.[7] .............................................. G06K 19/00
(52) U.S. Cl. ...................................... 235/487; 235/454
(58) Field of Search .............................. 235/487, 381, 235/462.01, 462.25, 472.01–472.03, 454

(56) References Cited

U.S. PATENT DOCUMENTS

| | | | | | |
|---|---|---|---|---|---|
| 3,970,803 A | * | 7/1976 | Kinzie et al. | ................ | 369/64 |
| 4,570,250 A | * | 2/1986 | Gabritsos et al. | ............ | 369/97 |
| 5,080,479 A | * | 1/1992 | Rosenberg | ................ | 352/92 |
| 5,751,398 A | * | 5/1998 | Beard | ................ | 352/236 |
| 5,896,403 A | | 4/1999 | Nagasaki et al. | ............ | 714/752 |
| 6,078,758 A | * | 6/2000 | Patton et al. | ............ | 396/312 |
| 6,108,640 A | * | 8/2000 | Slotznick | ................ | 705/26 |

* cited by examiner

*Primary Examiner*—Thien M. Le
(74) *Attorney, Agent, or Firm*—Frishauf, Holtz, Goodman & Chick, P.C.

(57) ABSTRACT

There is disclosed a printed material in which a railway route chart including station indications indicated by a predetermined symbol or pattern and a railway route indication disposed between the station indications and indicated by a predetermined symbol or pattern is printed, and in which a dot code as an optically readable coded image obtained by coding/processing a sound about railway is printed as the railway route indication.

27 Claims, 12 Drawing Sheets

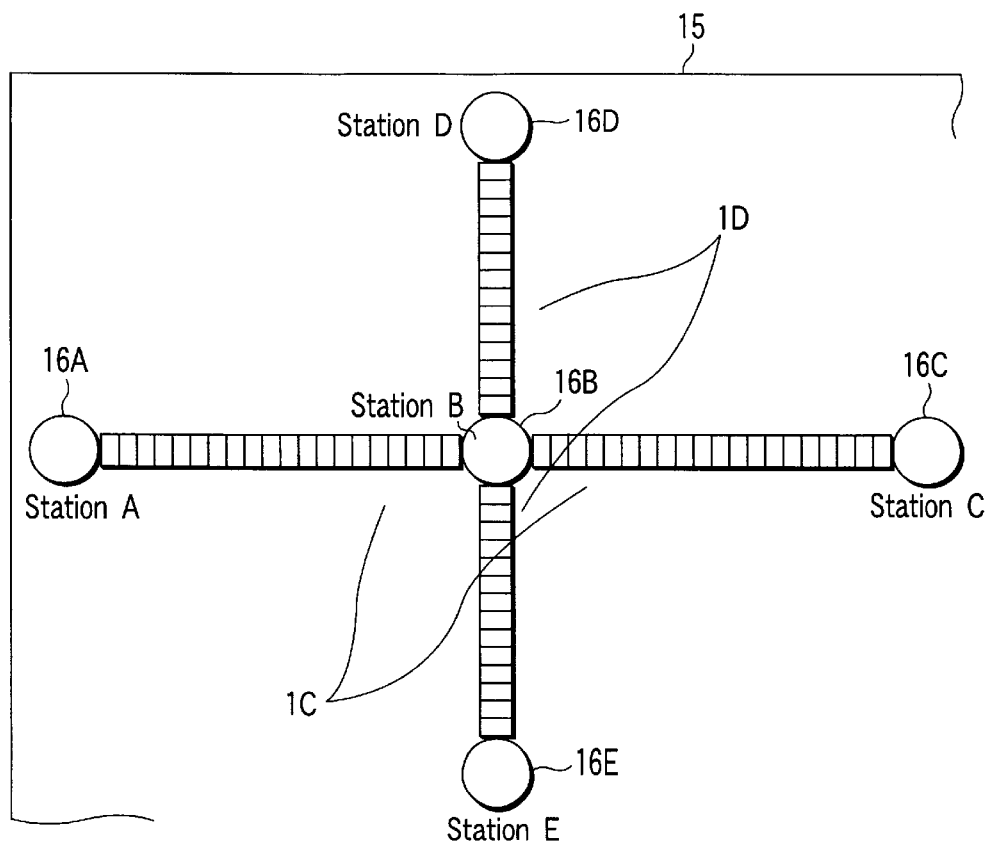
F I G. 12
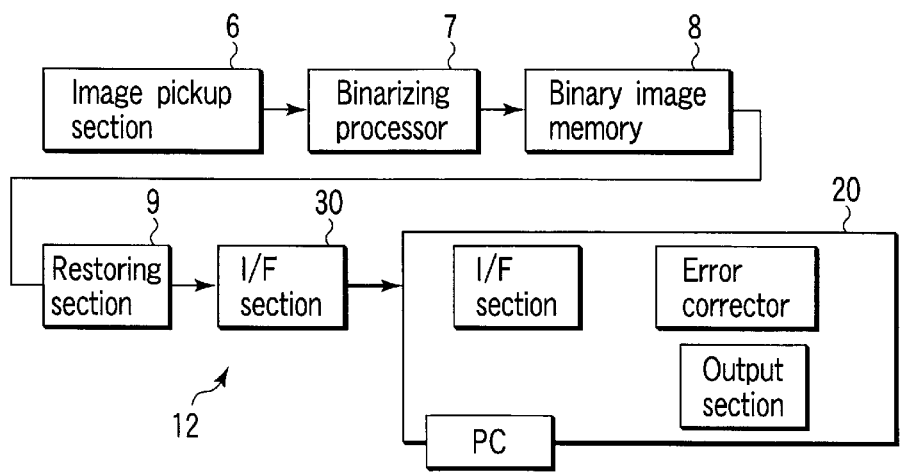
F I G. 13

0 : FD location
1 : HD location
2 : CD location
3 : URL

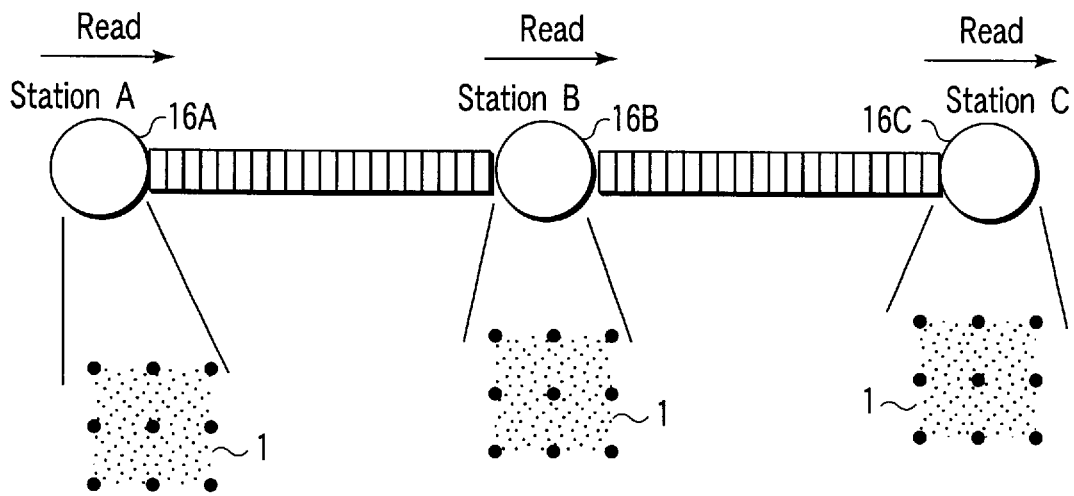
F I G. 22
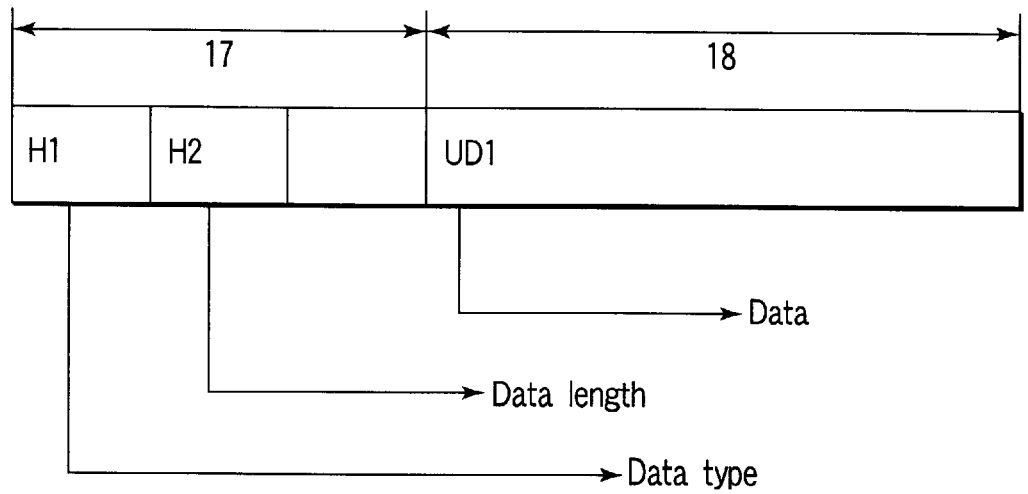
0 : Station name
1 : Station ID
2 : Others (route information)
F I G. 23

PRINTED MATERIAL WITH RAILWAY ROUTE CHART PRINTED THEREON, INFORMATION PRESENTING METHOD, INFORMATION PRESENTATION SYSTEM, INFORMATION RESOURCE, AND TICKET ISSUING METHOD

CROSS-REFERENCE TO RELATED APPLICATIONS

This application is based upon and claims the benefit of priority from the prior Japanese Patent Applications No. 2000-169211, filed Jun. 6, 2000; and No. 2001-123157, filed Apr. 20, 2001, the entire contents of both of which are incorporated herein by reference.

BACKGROUND OF THE INVENTION

The present invention relates to a printed material with a railway route chart printed thereon as an optically readable coded image by which sound and other various data can be reproduced, an information presenting method utilizing the printed material, an information presentation system utilizing the printed material, an information resource utilized for presenting information, and a ticket issuing method utilizing the printed material.

The printed material shown in FIG. 1 has heretofore been seen in a timetable, notebook, and other various publications, a toy, and the like.

That is, printed in the printed material shown in FIG. 1 is a railway route chart 203 including: a station indication 201 shown by a circle, square or another predetermined symbol or pattern; and a railway route indication 202 disposed between the station indications 201 and indicated by a predetermined symbol or linear pattern.

However, for such printed material, a picture, patterns, characters and other visually recognizable ordinary image information can be obtained from a sheet surface with the railway route chart printed thereon, but sound information and various other types of detailed information cannot easily be obtained.

That is, for example, a user cannot directly obtain an announcement sound for loudly reading a name of a station, an announcement sound of transfer to another route from the station, and various other sound information concerning railway and filled with a live feeling from a sheet surface with the railway route chart printed thereon.

Moreover, it has been difficult to directly obtain a timetable, required time, fare, and the like of a train running on a certain railway route from the railway route chart.

From such point of view, a printed material with a railway route chart printed thereon from which various sound and other detailed information about railway can easily be obtained has been desired in the market. Furthermore, a railway route chart full of much interest, fun and idea has also been desired.

However, there has been no example in which a technique of reading a coded image by manual scanning as disclosed in U.S. Pat. No. 5,896,403 is applied to a manufacturing method of a printed material with a railway route chart for presenting sound and other information printed thereon.

BRIEF SUMMARY OF THE INVENTION

The present invention has been developed in consideration of the aforementioned problem, and an object thereof is to provide a printed material on which a railway route chart including an optically readable coded image obtained by coding/processing sound and other information concerning railway is printed. The object of the present invention is also to provide an information presenting method utilizing the printed material, information presentation system utilizing the printed material, information resource utilized for presenting the information, and further, a ticket issuing method utilizing the printed material.

According to a first aspect of the present invention, there is provided a printed material with a railway route chart printed thereon, comprising:
  a portion with the railway route chart printed thereon, including a station indication indicated by at least one of a predetermined symbol and a predetermined pattern, and a railway route indication disposed between the station indications and indicated by at least one of a predetermined symbol and a predetermined pattern; and
  an optically readable coded image printed on either one of the station indication and the railway route indication and obtained by coding and processing a sound about railway.

According to a second aspect of the present invention, there is provided a printed material with a railway route chart printed thereon, comprising:
  a portion with the railway route chart printed thereon, including a station indication indicated by at least one of a predetermined symbol and a predetermined pattern, and a railway route indication disposed between the station indications and indicated by at least one of a predetermined symbol and a predetermined pattern; and
  an optically readable coded image printed on either one of the station indication and the railway route indication and obtained by coding and processing information corresponding to either one of a station and a railway route.

According to a third aspect of the present invention, there is provided an information presenting method comprising steps of:
  optically reading a coded image by a reading apparatus from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of the station indication and the railway route indication and obtained by coding and processing either one of station ID information for specifying a station and railway route ID information for specifying a railway route;
  reproducing either one of the station ID information and the railway route ID information from the read coded image;
  searching information about either one of the station and the railway route corresponding to either one of the reproduced station ID information and the reproduced railway route ID information from the information resource in which the information about a plurality of stations or the railway route is stored; and
  outputting the information about either one of the searched station and the searched railway route.

According to a fourth aspect of the present invention, there is provided an information presentation system comprising:

a reader for optically reading a coded image from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of the station indication and the railway route indication and obtained by coding and processing either one of station ID information for specifying a station and railway route ID information for specifying a railway route;

a reproducer for reproducing either one of the station ID information and the railway route ID information from the coded image read by the reader;

an information resource for storing information about a plurality of stations and the railway route;

a searcher for searching information about either one of the station and the railway route corresponding to either one of the station ID information and the railway route ID information reproduced by the reproducer from the information resource; and an output section for outputting the information about the station and the railway route searched by the searcher.

According to a fifth aspect of the present invention, there is provided an information resource comprising:

a searcher for searching information about either one of a station and a railway route corresponding to either one of station ID information and railway route ID information from information about a plurality of stations and the railway route, when a reading apparatus optically reads a coded image from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of the station indication and the railway route indication and obtained by coding and processing either one of the station ID information for specifying the station and the railway route ID information for specifying the railway route, and either one of the station ID information and the railway route ID information is reproduced from the read coded image; and an output section for outputting the searched information about either one of the station and the railway route.

According to a sixth aspect of the present invention, there is provided a ticket issuing method comprising steps of:

optically reading a coded image by a reading apparatus from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of the station indication and the railway route indication and obtained by coding and processing either one of station ID information for specifying a station and railway route ID information for specifying a railway route;

reproducing either one of the station ID information and the railway route ID information from the read coded image; and issuing a train ticket based on information about either one of the station an the railway route corresponding to either one of the reproduced station ID information and the reproduced railway route ID information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 12 is a diagram showing a constitution of a modification example of the first embodiment;

FIG. 13 is a diagram showing a constitution of the reading apparatus for use in a second embodiment of the present invention;

FIG. 22 is a constitution diagram of the printed material with the railway route chart printed thereon according to a fourth embodiment of the present invention; and FIG. 23 is a diagram showing the file structure of the dot code in the fourth embodiment.

DETAILED DESCRIPTION OF THE INVENTION

Prior to a detailed description of embodiments of the present invention, in order to deepen understanding of the present invention, first a coded image preferably used in a printed material with a railway route chart printed thereon according to the present invention, and a concrete constitution of a reading apparatus for optically reading the coded image will be described.

Examples of the coded image preferably used in the present invention, and the reading apparatus of the coded image include a dot code and a reading apparatus of the dot code disclosed in U.S. Pat. No. 5,896,403.

Figure 2:
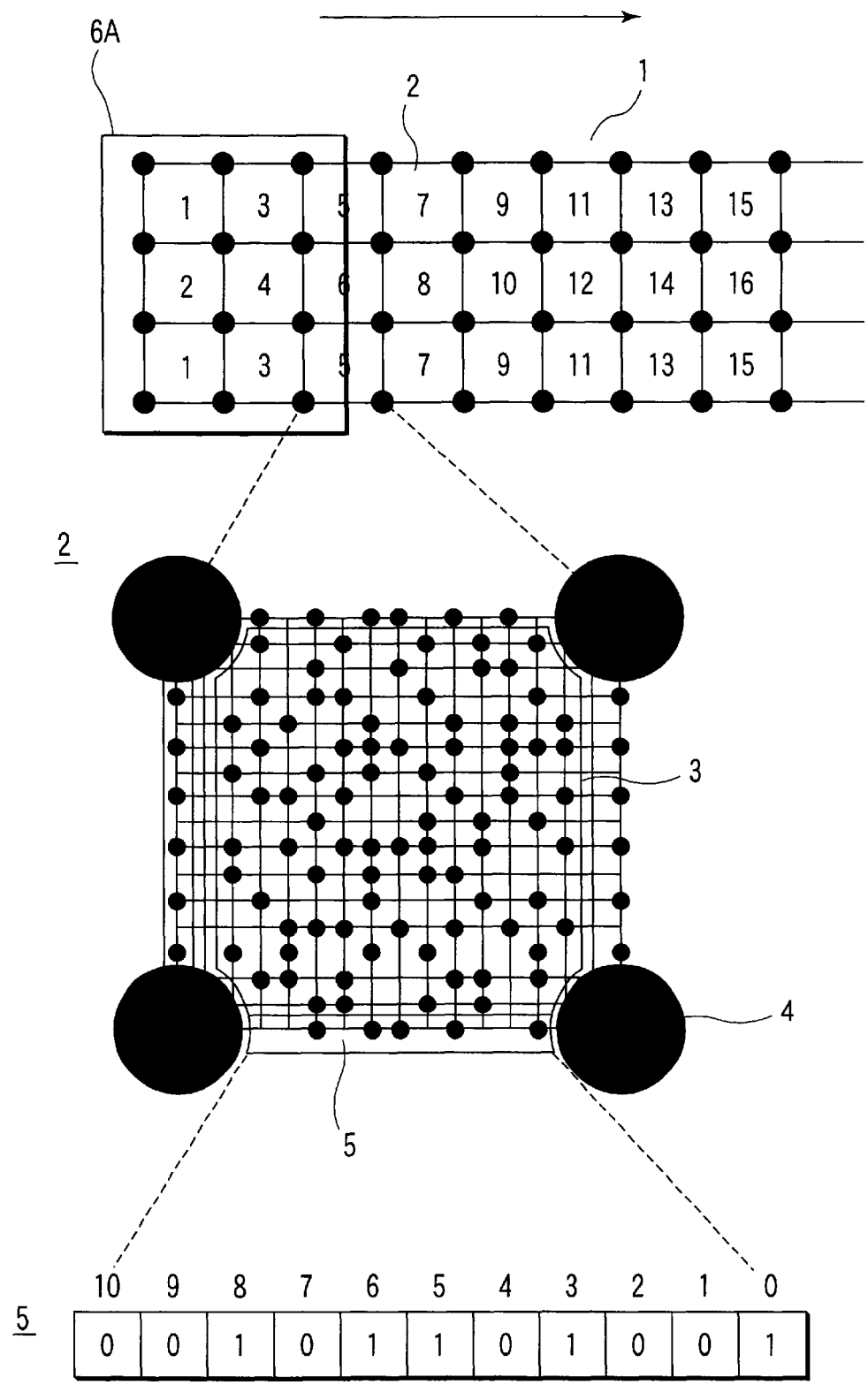
FIG. 2 is a diagram showing a physical format of a dot code employed by the printed material with the railway route chart printed thereon according to the present invention.

FIG. 2 is a diagram showing a physical format of a dot code 1.

As shown in FIG. 2, the dot code 1 is basically constituted by arranging a plurality of rectangular blocks 2 adjacent to one another in a two-dimensional manner.

The block 2 is constituted of a data dot pattern portion 3, markers 4, and block address pattern portion 5. Sound data divided in respective blocks exists as a dot image of a white dot or a black dot corresponding to a data value "0" or "1" in a predetermined arrangement form in the data dot pattern portion 3. The marker 4 is used to find a reference point for detecting each dot (data dot) of the data dot pattern portion 3, disposed in four corners of each block 2, and has a constant black continuous number. The block address pattern portion 5 is disposed between the markers 4 in such a manner that the portion can be recognized during reading of the plurality of different blocks 2, and includes an error detection or correction code. Additionally, longitudinal and lateral lines in FIG. 2 are drawn to indicate respective dot positions for convenience, and the white dot indicates a ground color of a sheet surface itself. Furthermore, in FIG. 2, for the sake of description, a block address value is indicated in a square frame representing the block, and the numeric character is not actually recorded.

Figure 3:
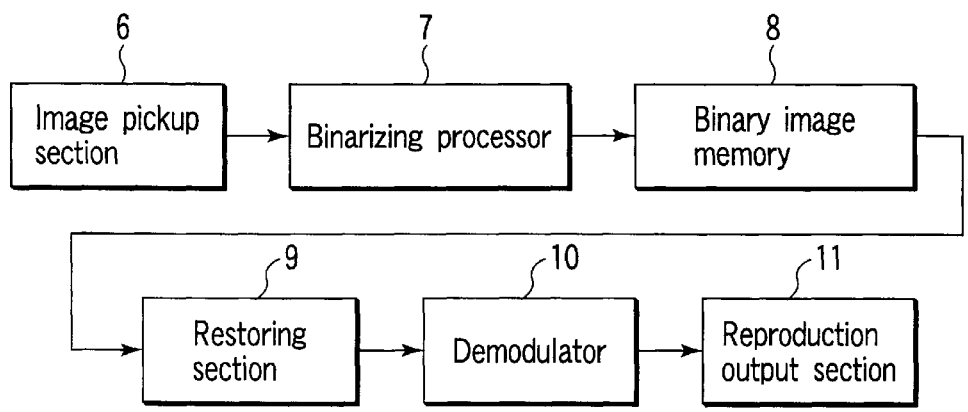
FIG. 3 is a diagram showing a constitution of a reading apparatus for reproducing information of the dot code.

FIG. 3 is a diagram showing an electric function block constitution of the reading apparatus for optically reading the dot code 1 by manual scanning.

That is, the reading apparatus is constituted of a lighting section and optical system (not shown), image pickup section 6, binarizing processor 7, binary image memory 8, restoring section 9, demodulator 10, and reproduction output section 11.

The lighting section lights the dot code 1, and is constituted of LED, and the like. The optical system forms a reflected light of the dot code 1 into an image. The image pickup section 6 picks up the image formed by the optical system, and includes area sensors such as CCD. In the present invention, the lighting section, optical system and image pickup section 6 constitute a reader.

The binarizing processor 7 binarizes/processes an image pickup signal outputted from the image pickup section 6 with a predetermined binarizing threshold value. The binary image memory 8 stores binary image data binarized by the binarizing processor 7. The restoring section 9 reads the binary image data stored in the binary image memory 8, detects the dot, assigns the value "0" or "1" to each detected dot, and outputs the data. The demodulator 10 demodulates the data outputted from the restoring section 9. The reproduction output section 11 performs an error correction processing, data extension processing, and the like, reproduces data of an original sound, and outputs the data via a speaker or the like.

Figure 4:
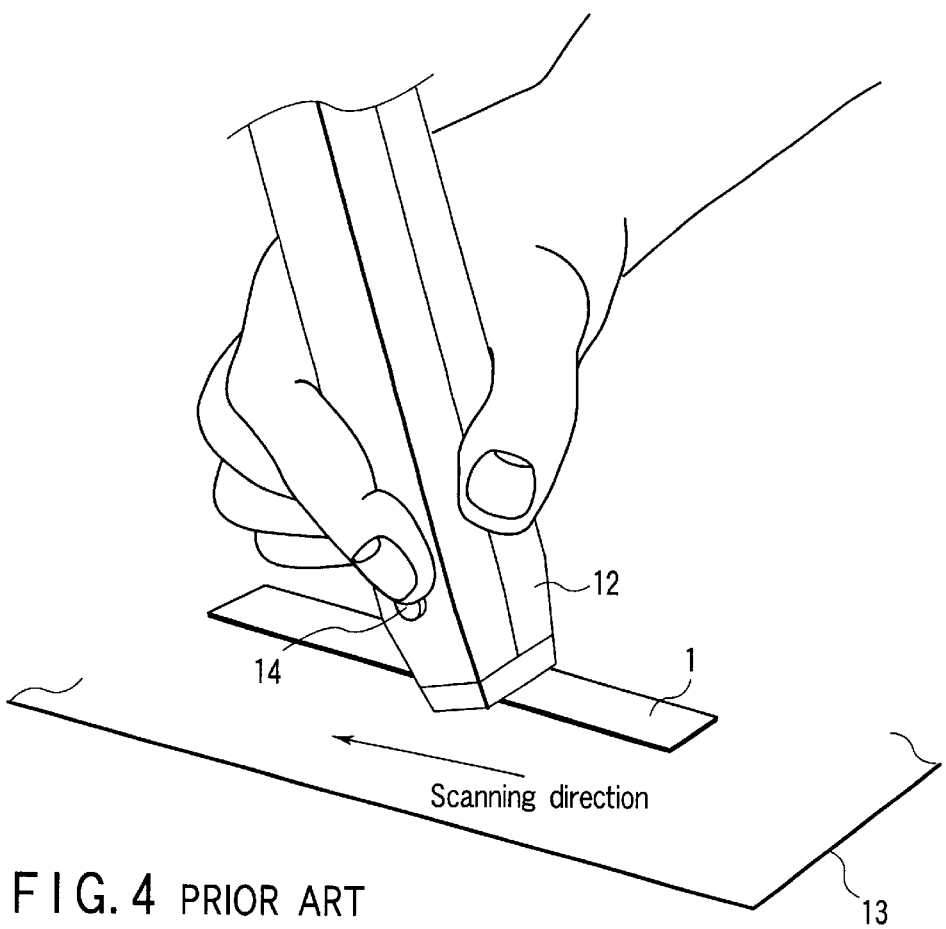
FIG. 4 is a diagram showing a use mode of the reading apparatus.

Therefore, according to the reading apparatus, even if a whole size of the dot code 1 is larger than an image pickup field 6A of the image pickup section 6 as shown in FIG. 4, the reading apparatus can read the whole dot code 1 on a printed material 13 by pressing a scanning switch 14 of a reading apparatus 12, sequentially manual scanning the dot code 1 in a direction of an arrow, and picking up images by dividing the dot code into regions.

That is, in other words, even when the image of the dot code 1 cannot be taken with one shot, each address applied to each block 2 can be detected together with the data dot included in the block 2 by a block unit. In this case, all of the original data can be reconstructed from the data included in each block 2, and a large volume of data can actually be recorded, for example, with respect to a sheet surface or the like. Therefore, this technique is also preferable for recording sound on the sheet surface.

Here, when the restoring section 9 reads binary image data stored in the binary image memory 8 and detects each dot, the section first finds the marker 4 from the binary image data. Subsequently, a reading reference position of the dot is obtained based on a gravity position of the found marker 4. Next, a dot reading point for reading each data dot from the data dot pattern portion 3 is detected from the obtained dot reading reference positions, and it is judged whether a pixel of the detected reading point is white or black. The restoring section 9 is thereby constituted to assign the value "0" or "1" to each dot and output data.

Moreover, since inputted sound data as a recording object is subjected beforehand to a modulation processing during recording of the dot code 1, the demodulator 10 performs a processing to return the data back to the original data before modulation.

Figure 5:
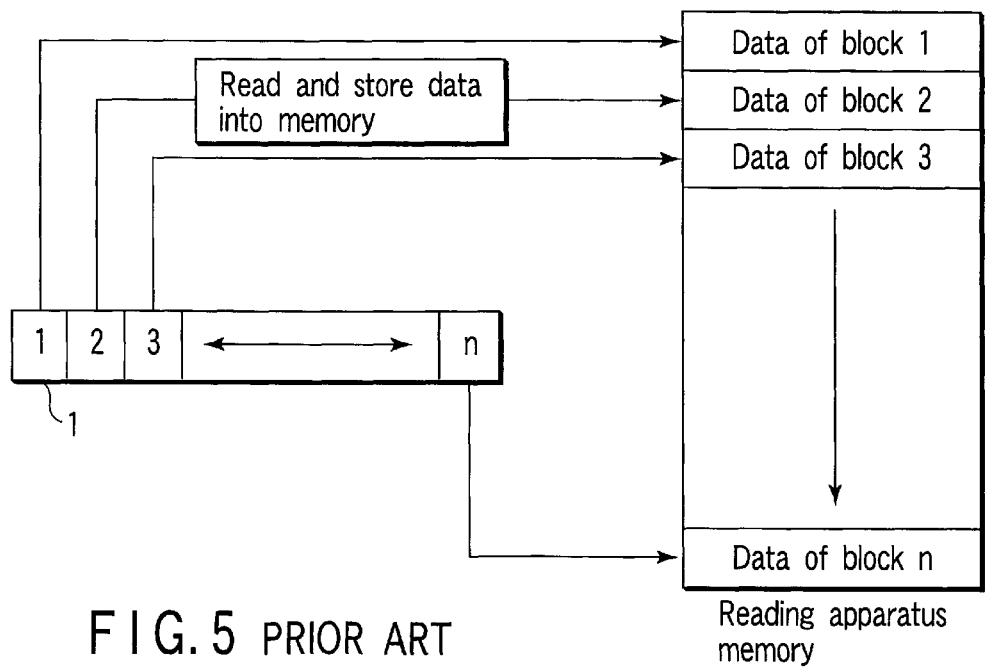
FIG. 5 is an explanatory view of a process for storing block data.

That is, the modulation processing is performed in such a manner that the restoring section 9 first finds the marker 4 easily. In order to distinguish the image of each data dot in the data dot pattern portion 3 from the image of the marker 4, the modulation processing is performed on the inputted sound data, so that a continuous number of black dots in the data dot pattern portion 3 becomes smaller than the continuous number of black dots constituting the markers 4. Subsequently, as shown in FIG. 5, the demodulated data in each block is rearranged in accordance with the detected block address regardless of a block detection order, stored in a memory (not shown) in the reproduction output section 11, and subsequently subjected to the error correction processing, data extension processing, and the like.

The aforementioned respective functions are stored in the reading apparatus of a pen type as shown in FIG. 4, or of a mouse type (not shown).

A printed material with a railway route chart printed thereon according to embodiments of the present invention will be described hereinafter in detail with reference to the drawings. In the embodiments, the dot code 1 is used as the coded image.

[First Embodiment]

Figure 1:
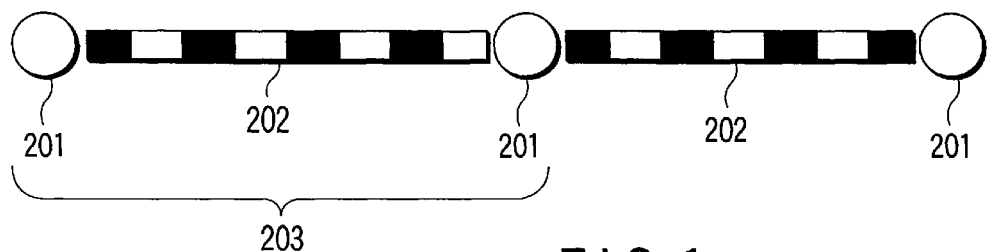
FIG. 1 is a diagram showing one example of a printed material with a railway route chart printed thereon according to a conventional art.
Figure 6:
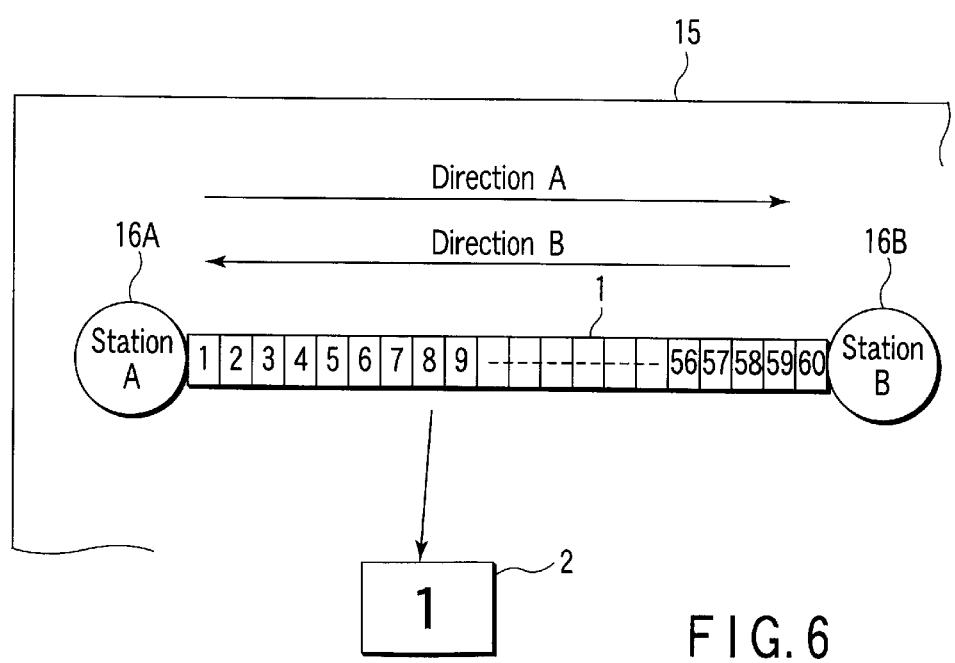
FIG. 6 is a constitution diagram of the printed material with the railway route chart printed thereon according to a first embodiment of the present invention.

FIG. 6 is a diagram showing a constitution of the printed material with the railway route chart printed thereon according to a first embodiment of the present invention. In this embodiment, the present invention is applied to a portion corresponding to the aforementioned railway route chart 203 in the printed material of FIG. 1.

That is, as shown in FIG. 6, in a printed material 15, a railway route indication (corresponding to the railway route indication 202 of FIG. 1) corresponding to a track is disposed between a station A indication 16A and a station B indication 16B, and constituted of the dot code 1. As described above, the block address is assigned to each block 2 of the dot code 1. Additionally, in FIG. 6, for the description, the block address value is shown in the square frame representing the block, but in actuality, as shown in FIG. 2, the block address is recorded in the block address pattern portion 5.

During reading/scanning (hereinafter referred to simply as scanning) of the dot code 1 constituted as described above with the reading apparatus, when the material is scanned in a direction A of FIG. 6, sound concerning station B is reproduced. That is, for example, sound "This is station B, station B." is reproduced. Conversely, when the material is scanned in a direction B of FIG. 6, sound concerning station A is reproduced. That is, for example, sound "This is station A, station A." is reproduced.

A time series change of the address of the detected dot code 1 depends upon the scanning direction. This is used to change the reproduction information.

That is, as seen from FIG. 6, with the direction A, the detected address is in an ascending order. On the other hand, with the direction B, the detected address is in a descending order. The reading apparatus utilizes this to detect the direction.

Here, the direction detection will be described in more detail with reference to FIG. 7 and FIG. 8.

Figure 7:
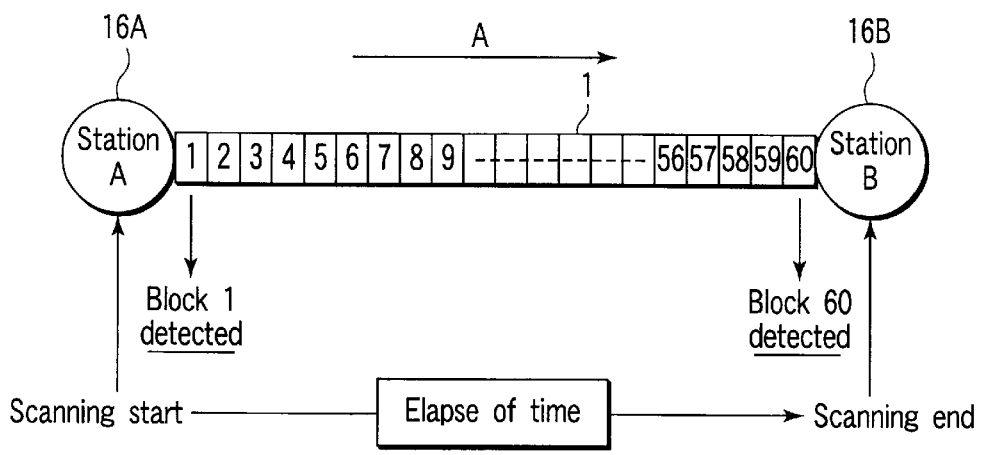
FIG. 7 is an explanatory view of direction detection.

As shown in FIG. 7, the direction can easily be judged by comparing the address of the first detected block with that of the last detected block.

Figure 8:
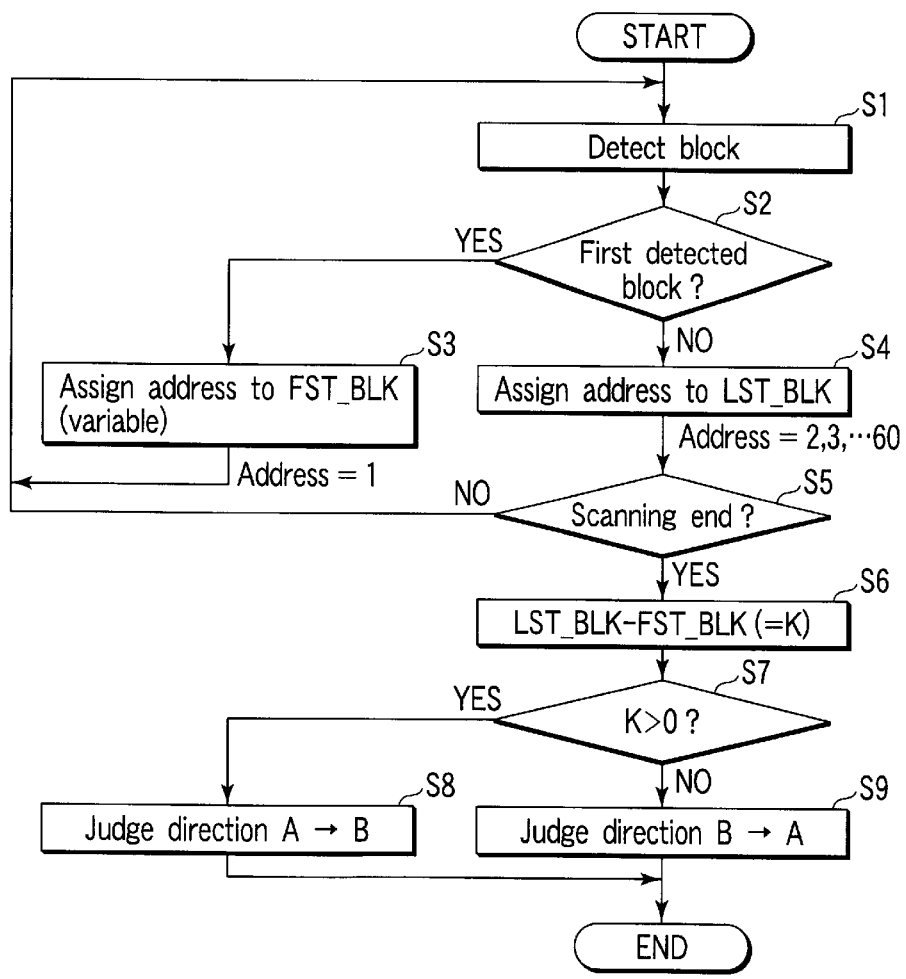
FIG. 8 is a flowchart showing a flow for reproducing information of the dot code of the printed material with the railway route chart printed thereon according to the first embodiment of the present invention.

FIG. 8 is a flowchart showing a sequence of the direction detection.

That is, after the scanning switch 14 is pressed to start reading the dot code 1, block 2 is detected (step S1), and the first detected block address is recorded in a specific memory region (FST_BLK) (steps S2, S3). While the scanning switch 14 is pressed, the detected block address is overwritten in another specific region (LST_BLK) (step S4). When scanning ends, and the scanning switch 14 is released (step S5), a difference K is obtained (step S6). When the difference K is larger than 0, a direction of station A→station B is judged (steps S7, S8). Moreover, when the difference K is smaller than 0, a direction of station B→station A is judged (steps S7, S8), and the present sequence ends.

Additionally, in the example of FIG. 7, the first detected block address is "1", and the last detected block address is "60". Since the difference "59" is larger than 0, the direction of station A→station B is judged.

A modification example of the direction detecting method will next be described with reference to FIG. 9.

In this example, the successively detected block address is recorded at each given time. When the scanning ends, the direction is judged based on a tendency of the change of the recorded block address. That is, in further detail, the first block address is subtracted from the second recorded block address, and it is judged whether the difference is positive or negative. Then, the second block address is subtracted from the third block address, and it is judged whether the difference is positive or negative. Subsequently, similarly, an n-th block address is successively subtracted from (n+1)-th block address, and the direction is decided by a majority of positive/negative differences.

Figure 9:
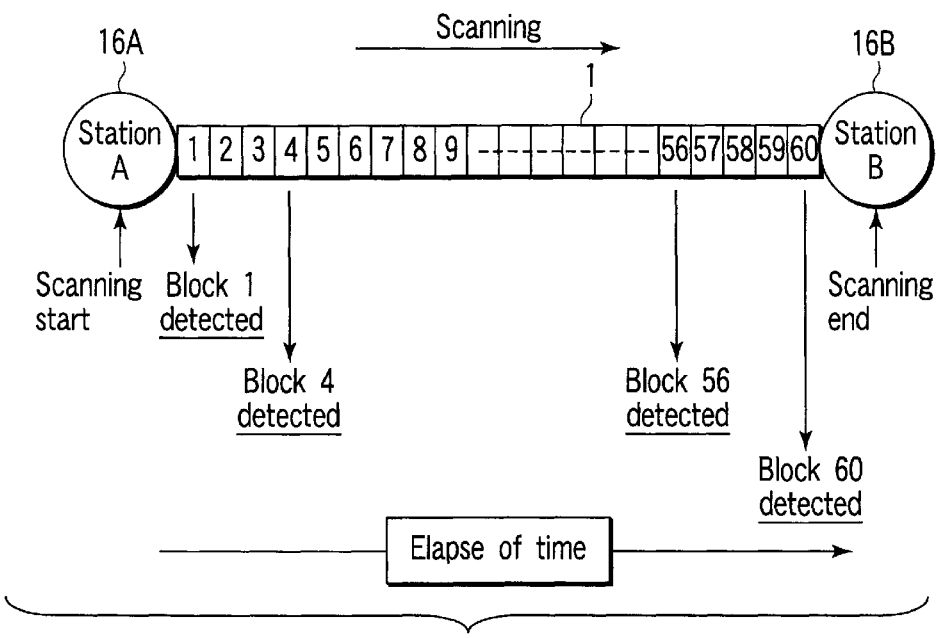
FIG. 9 is an explanatory view of a modification example of direction detection.

In the example of FIG. 9, 4−1=3 (positive), . . . , 60−56=4 (positive). As a result, the number of positive differences is large, and the station A→station B direction can be judged by majority decision.

The direction is detected in the aforementioned method. For the sound itself recorded as the dot code 1, the sound for the opposite directions is recorded beforehand. That is, the sound is recorded in such a manner that sound data "this is station A" and sound data "this is station B" can selectively be reproduced.

Figure 10:
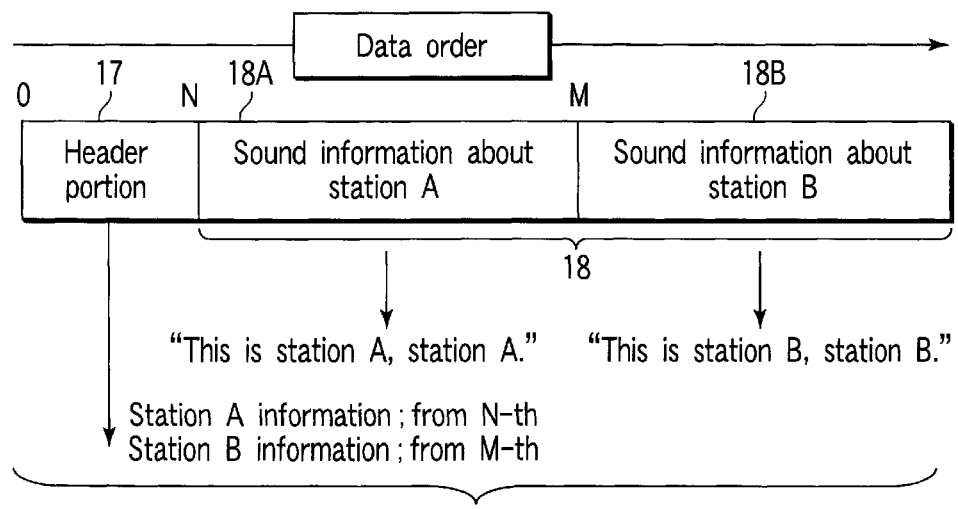
FIG. 10 is a diagram showing a file structure of the dot code in the first embodiment.

In detail, each sound data unit is subjected to interleaving/ECC, and in each unit the continuous block addresses may be assigned to record the information. That is, as shown in FIG. 10, in sound information 18A, 18B recorded in a user data portion 18 subsequent to a header portion 17, continuous block addresses are assigned, and the information is recorded.

A sound reproducing method will next be described with reference to FIG. 11. In this case, the dot codes 1 are scanned over a plurality of stations.

When the dot codes 1 are scanned over a plurality of stations, information about the next station as seen from a scanning stop point is reproduced.

Figure 11:
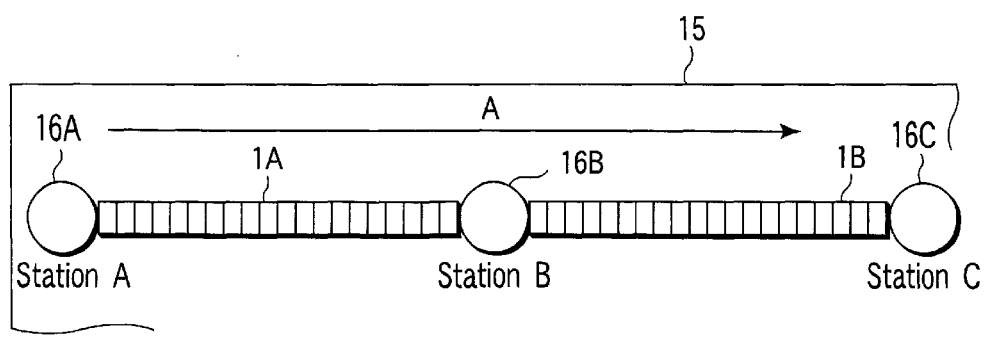
FIG. 11 is an explanatory view of a sound reproduction technique by continuous scanning.

In FIG. 11, a dot code 1A including a certain sound is disposed between the station A indication 16A and the station B indication 16B, and a dot code 1B including another sound is disposed between the station B indication 16B and a station C indication 16C. Subsequently, during scanning at a stretch in the direction A of FIG. 11, only the sound about the station C corresponding to the sound included in the latter dot code 1B is reproduced.

When the blocks having an equal address are detected, the sound reproduction can easily be achieved by setting the block detected later to be effective.

Concretely, even when the reading apparatus extracts the blocks having the same address, the block data may be recorded in the same storage place of the same apparatus determined by the address, that is, the data may be overwritten. Additionally, in this case, any code needs to have substantially the same number of blocks. When the number of blocks is small, a dummy block needs to be added.

No dot code exists in the region corresponding to the station. This is utilized in another method. When there is no block input for a given period, the read block data is invalidated. Even in this method, a similar effect can be expected.

The first embodiment of the present invention has been described above, but the present invention is not limited to this embodiment, and can be variously modified or changed within the scope of the present invention.

For example, to make the railway route chart more natural, a code printing color can be changed with the route. That is, in an example shown in FIG. 12, dot codes 1C printed in black are assigned between the station A indication 16A and the station B indication 16B, and between the station B indication 16B and the station C indication 16C. Dot codes 1D printed in cyan are assigned between a station D indication 16D and the station B indication 16B, and between the station B indication 16B and a station E indication 16E. This suggests different routes.

Alternatively, the portions corresponding to the track and station are usually printed by visible information, that is, a predetermined symbol and pattern, and the dot code 1 is printed as invisible information on the portions using an infrared absorption ink or the like, which can be more natural. Moreover, instead of continuously printing the blocks 2, the block may be printed at given intervals like the track in a map.

[Second Embodiment]

The dot code 1 corresponding to the railway route disposed between the station indications can include not only the aforementioned sound information but also a required time for a certain train moving between the stations, a distance between the stations, various text data, and other data.

A second embodiment of the present invention will be described hereinafter.

FIG. 13 is a diagram showing a constitution of the reading apparatus 12 for use in the second embodiment. That is, in the second embodiment, the reading apparatus 12 is connected to a personal computer (hereinafter abbreviated as PC) 20, and transfers data read from the coded image to the PC 20.

Here, since the image pickup section 6, binarizing processor 7 and binary image memory 8 are the same as those of FIG. 4, the description thereof is omitted. Moreover, in the second embodiment, the restoring section 9 further includes a memory function for storing data by a demodulated block unit. An I/F section 30 has an interface function such as RS232C, and universal serial bus (USB). This function realizes transfer of the detected block unit of data to the PC20. Additionally, the PC 20 includes an I/F section, error corrector, and output section, and these sections constitute a reproduction section.

In the reading apparatus for reproducing the sound as described in the first embodiment, restoration of the dot code 1, error correction, and data extension processing are all performed inside the single-body apparatus. On the other hand, for data reading as described in the second embodiment, the processing up to the restoration of the dot code 1 is performed on a reading apparatus 12 side, and the subsequent processing may be performed on a PC 20 side. When an error is probable between the reading apparatus 12 and the PC 20, the error can be corrected on the PC side. Moreover, for compressed data, the data is sent to the PC 20 side in a compressed state, and decompressed by the PC 20. In this case, a transfer data amount can be reduced, a transfer time can be shortened, and other advantages can be expected. Additionally, most of the processes on the PC 20 side such as the error correction can easily be realized with software.

An example of the printed material to be read by the aforementioned hardware will next be described.

Figure 14:
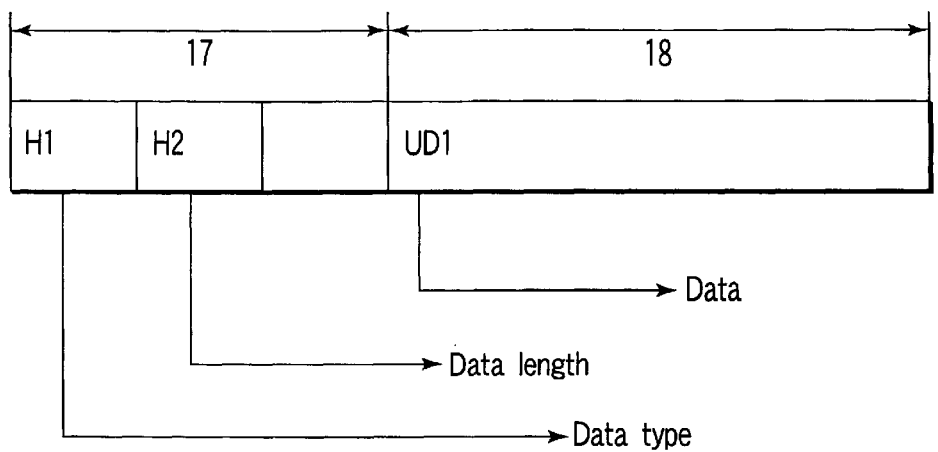
FIG. 14 is a diagram showing the file structure of the dot code in the second embodiment.
Figure 15:
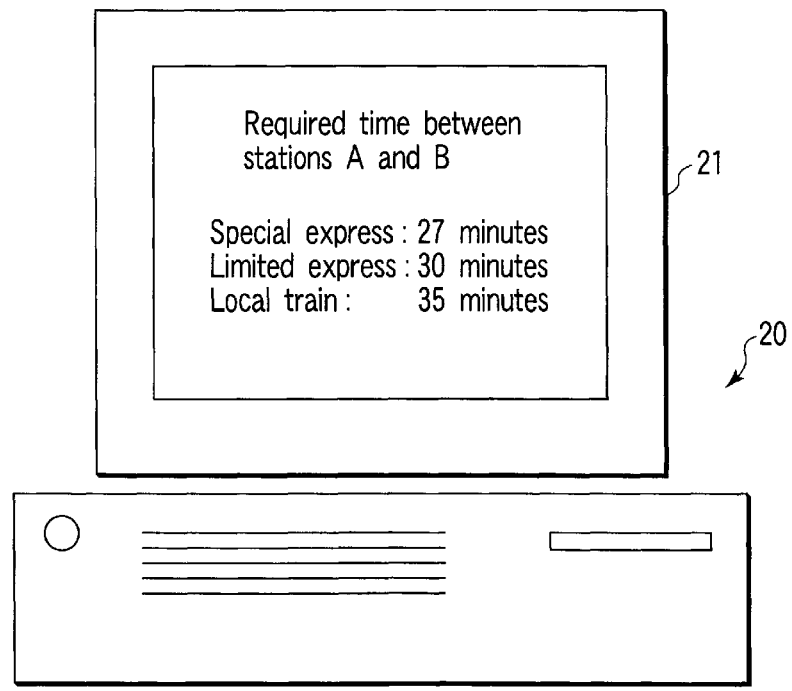
FIG. 15 is a diagram showing a display example in which a single section is scanned.

FIG. 14 shows a file structure of the dot code 1 in which the required time for the train is recorded, and FIG. 15 shows information displayed on a monitor 21 of the PC 20.

That is, as shown in FIG. 14, the header portion 17 includes data type and length. For example, when the "required time" is set as the data type, the user data portion 18 includes data indicating the required time for each type of train. Moreover, when the dot code 1 is scanned, the required time for each of a special express train, limited express train, and local train is displayed in the monitor 21 of the PC 20. Additionally, the data indicating the required time is simply recorded in a text file form.

Figure 16:
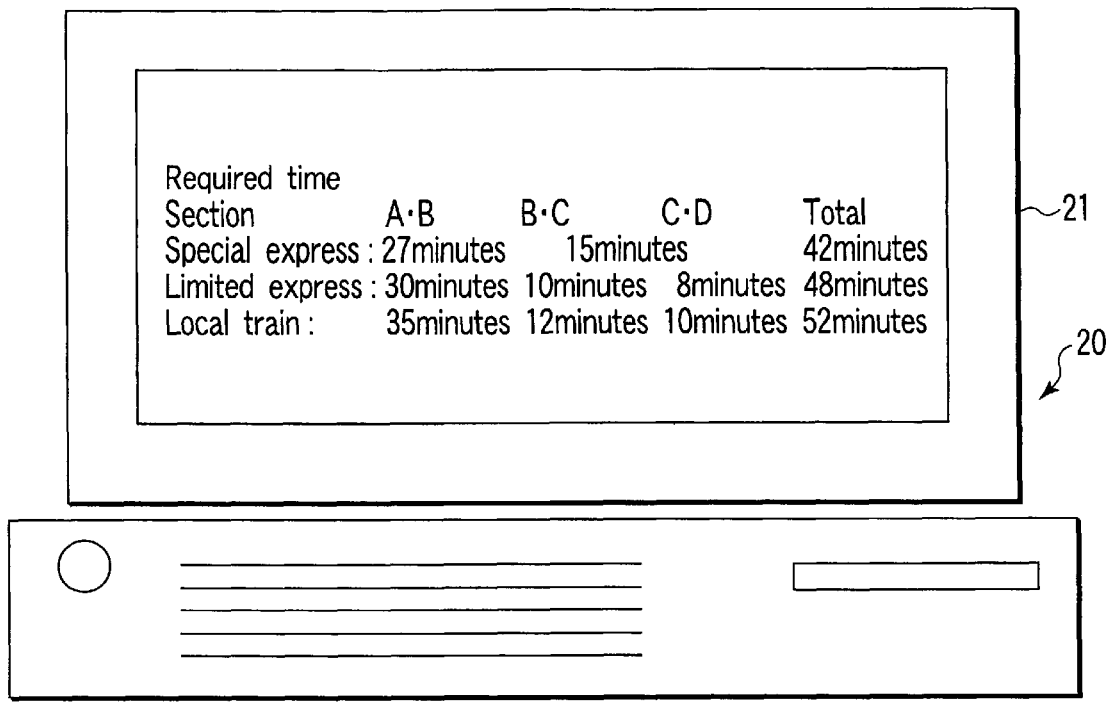
FIG. 16 is a diagram showing a display example in which a plurality of sections is scanned.

Moreover, when a plurality of route sections are continuously scanned, that is, when information to station C from station A via station B is necessary, the block addresses of the respective routes are prevented from overlapping each other. Thereby, information of all the scanned routes can be collected. Furthermore, in this case, the software of the PC 20 can integrate the information of the respective routes, and calculate and display the required time between the stations A and C as shown in FIG. 16.

This also applies even to the user data portion 18 including the timetable and fare, and the data is simply recorded in the text file form. Additionally, when the difference from the next station is recorded and integrated, and the actual fare, and the like are obtained, the recorded data amount can be saved.

The dot code 1 in which a data storage destination (address information for designating an information resource) is recorded will next be described.

Figure 17:
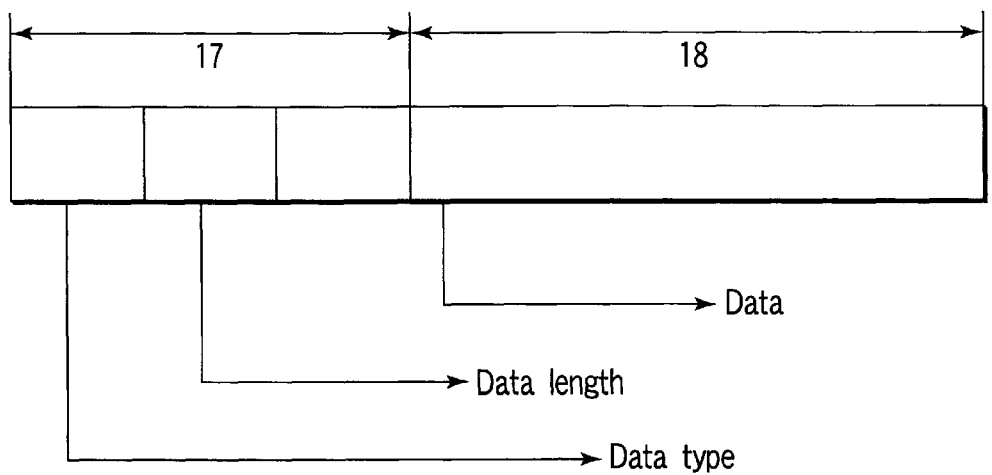
FIG. 17 is a diagram showing another example of the file structure of the dot code in the second embodiment.

FIG. 17 shows the file structure. That is, the structure is basically constituted of the header portion 17 and user data portion 18. In the header portion 17, data storage destination types are indicated as the information resource. Concretely, auxiliary storage apparatus types such as CD-ROM, hard disk, and floppy disk are written in the portion. Moreover, drive numbers are written as concrete address information in the user data portion 18.

Moreover, the storage destination may be a server connected via a computer network such as the Internet. For example, the destination may also be a network database presented in the form of a home page on the World Wide Web (WWW).

Figure 18:
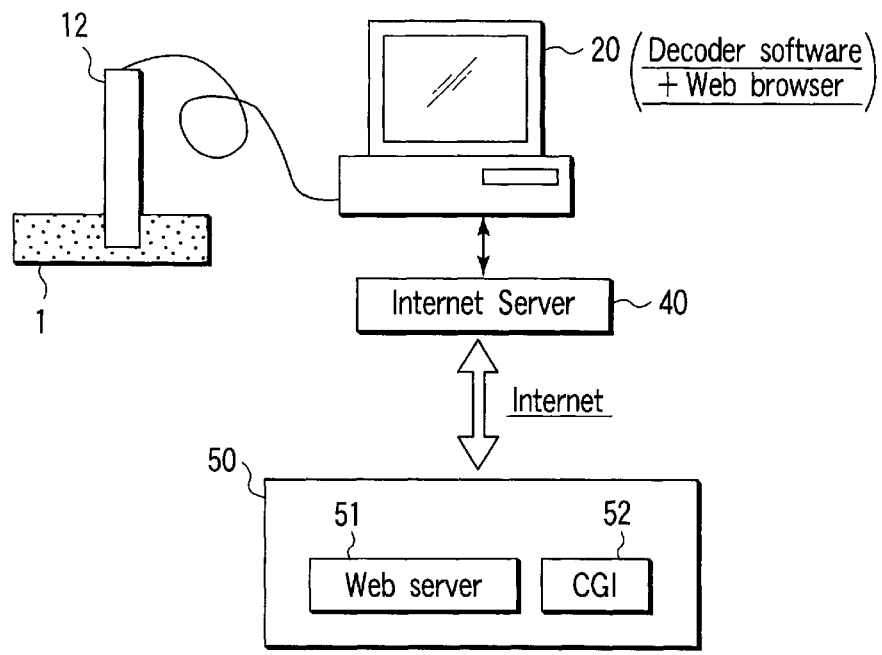
FIG. 18 is a diagram showing a constitution of an information presentation system to which the second embodiment is applied.

A system constitution diagram for this system is shown in FIG. 18. That is, the PC 20 connected to the reading apparatus 12 having the I/F function with the PC 20 is connected to an application server 50 via an Internet server 40 as a gateway to the Internet. The application server 50 is constituted of a Web server 51, and a common gateway interface (CGI) 52 for performing various processings, and stores the information about the respective railway routes.

Figure 19:
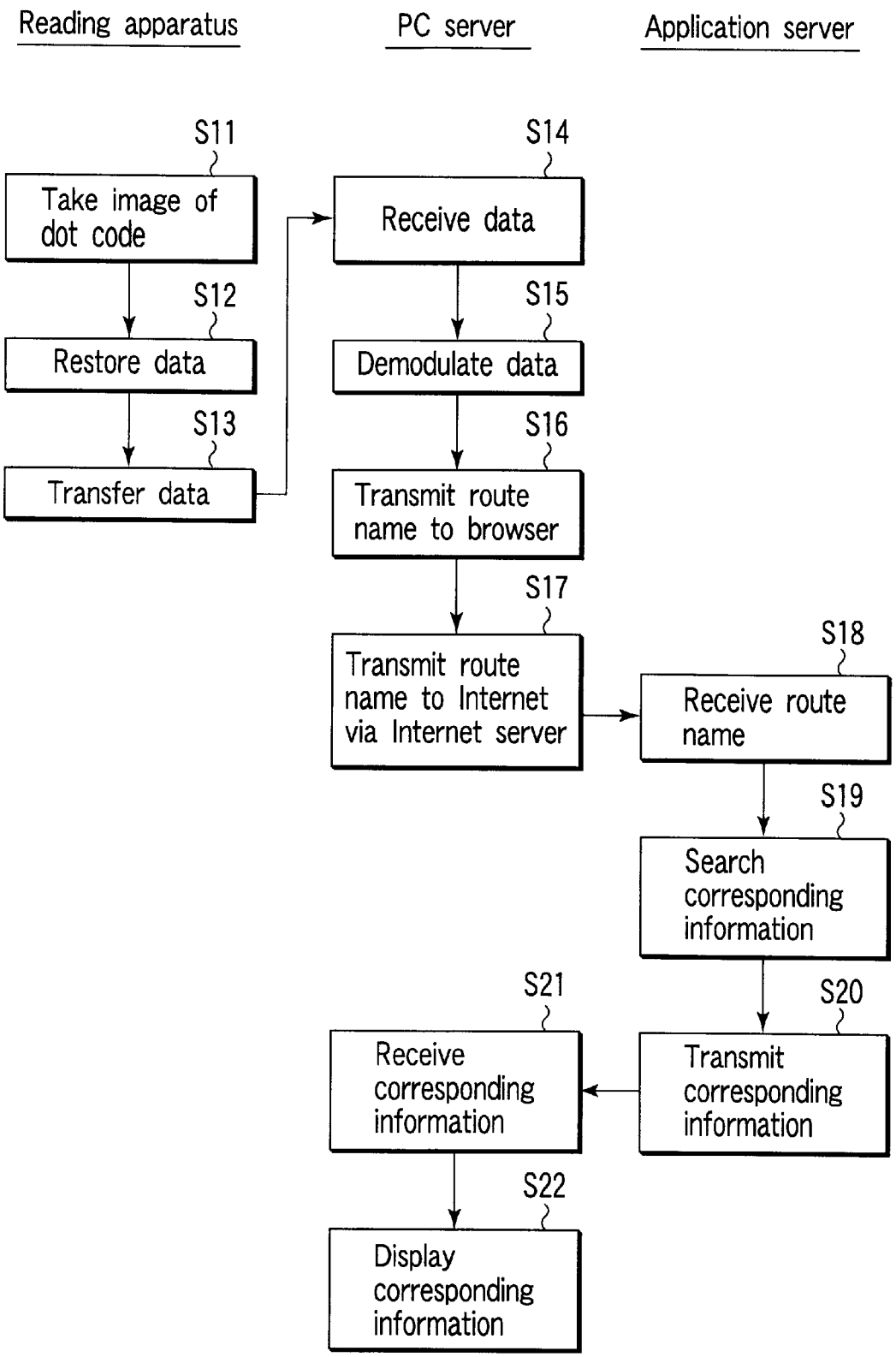
FIG. 19 is an explanatory view of a processing flow in the information presentation system according to the second embodiment.

A flow of the system processing will next be described with reference to FIG. 19.

Additionally, in this case, it is assumed that the URL is recorded as address information in the header portion 17, and railway route identification (ID) information indicating the route is recorded in the user data portion 18.

That is, a user scans the dot code 1 whose information is to be obtained with the reading apparatus 12 (step S11). Then, as described above, data image pickup and restoration are performed on the reading apparatus 12 side (step S12). Subsequently, the restored data is transmitted to the PC 20 via the I/F section 30 (steps S13, S14), the reproduction processing such as error correction is performed by decoder software, and the final data is obtained (step S15). That is, the URL and railway route ID information indicating route name are obtained. The decoder software transfers the ID information and Web server URL address to a Web browser (step S16). The Web browser transmits data to the application server 50 corresponding to the URL via the Internet server 40 (steps S17, S18). Subsequently, the application server 50 searches and outputs the received data, that is, the information corresponding to the designated railway route (step S19), and follows a reverse flow to return the information to the PC 20 (steps S20, S21). Thereby, the Web browser of PC 20 outputs the received data to a screen of the monitor 21 (step S22).

In the second embodiment, when the plurality of route sections is continuously scanned, that is, when the information to station C from station A via station B is necessary, the following constitution is used.

It is now assumed that the respective route data are constituted of the same number of blocks and the respective routes have the same block address. That is, for example, when each route is constituted of the data of 30 blocks, each route is constituted of blocks with addresses "0" to "29" assigned thereto. In this case, the first detected blocks "0" to "29" during scanning are stored as scanning start point information on a memory (not shown) of the reading apparatus 12, and the subsequent detected blocks are stored as end point block data in another portion of the same memory. Moreover, the end point information is overwritten in the portion determined by the block address every time a new block is detected. Finally, when the scanning switch 14 is released and the scanning ends, the remaining data is used as the block data about end point route. These start and end point blocks are demodulated and the railway route ID information of both points are obtained. For example, the PC 20 reads a table of route sections and required time from a hard disk (not shown) as a peripheral storage apparatus, and obtains the required time and the like for the start and end point stations. Subsequently, the data is displayed in a predetermined format.

[Third Embodiment]

A third embodiment of the present invention will next be described. In the third embodiment, the Internet is utilized to issue a ticket. In this system, a train seat is reserved and ticket is issued by communication with a WWW server connected to the Internet.

Figure 20:
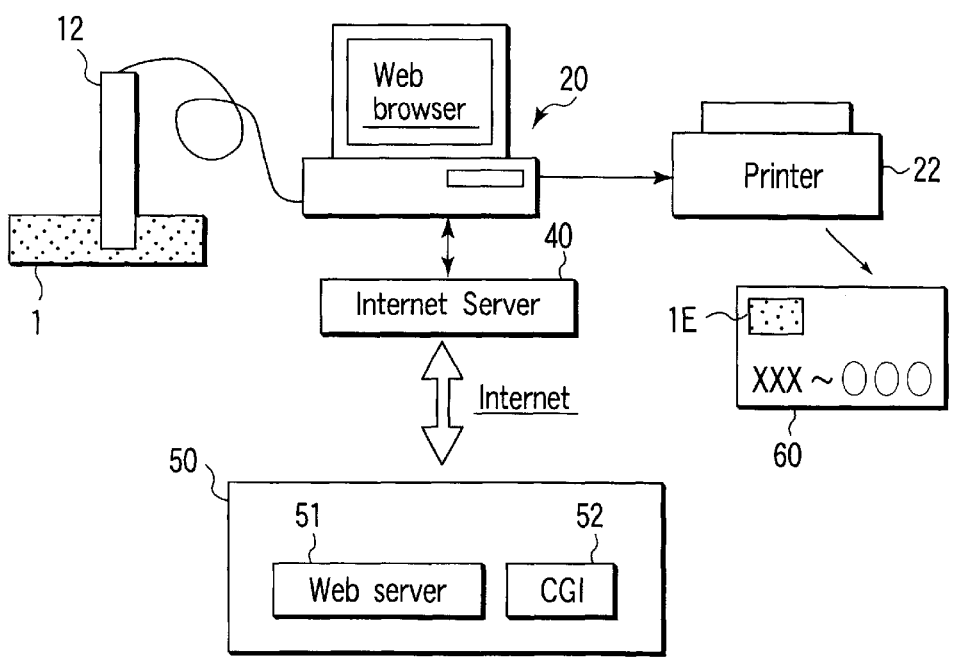
FIG. 20 is a diagram showing a constitution of a ticket issuance system to which a third embodiment of the present invention is applied.

FIG. 20 is a diagram schematically showing a constitution of the system. The system is basically constituted by adding a constitution for printing the dot code to the system shown in FIG. 18. That is, the reading apparatus 12, PC 20, Internet server 40, and application server 50 are the same as those of FIG. 18. Additionally, in the third embodiment, software concerning ticket issuance is installed on the PC 20. Moreover, in the third embodiment, the PC 20 is connected to a printer 22 for printing a ticket 60 including a dot code 1E. Not only a boarding section, fare, date, and other general information to be printed on the ticket but also the dot code 1E are printed on the printed ticket 60. A reference number or the like for preventing illegal use is recorded in the dot code 1E.

Figure 21:
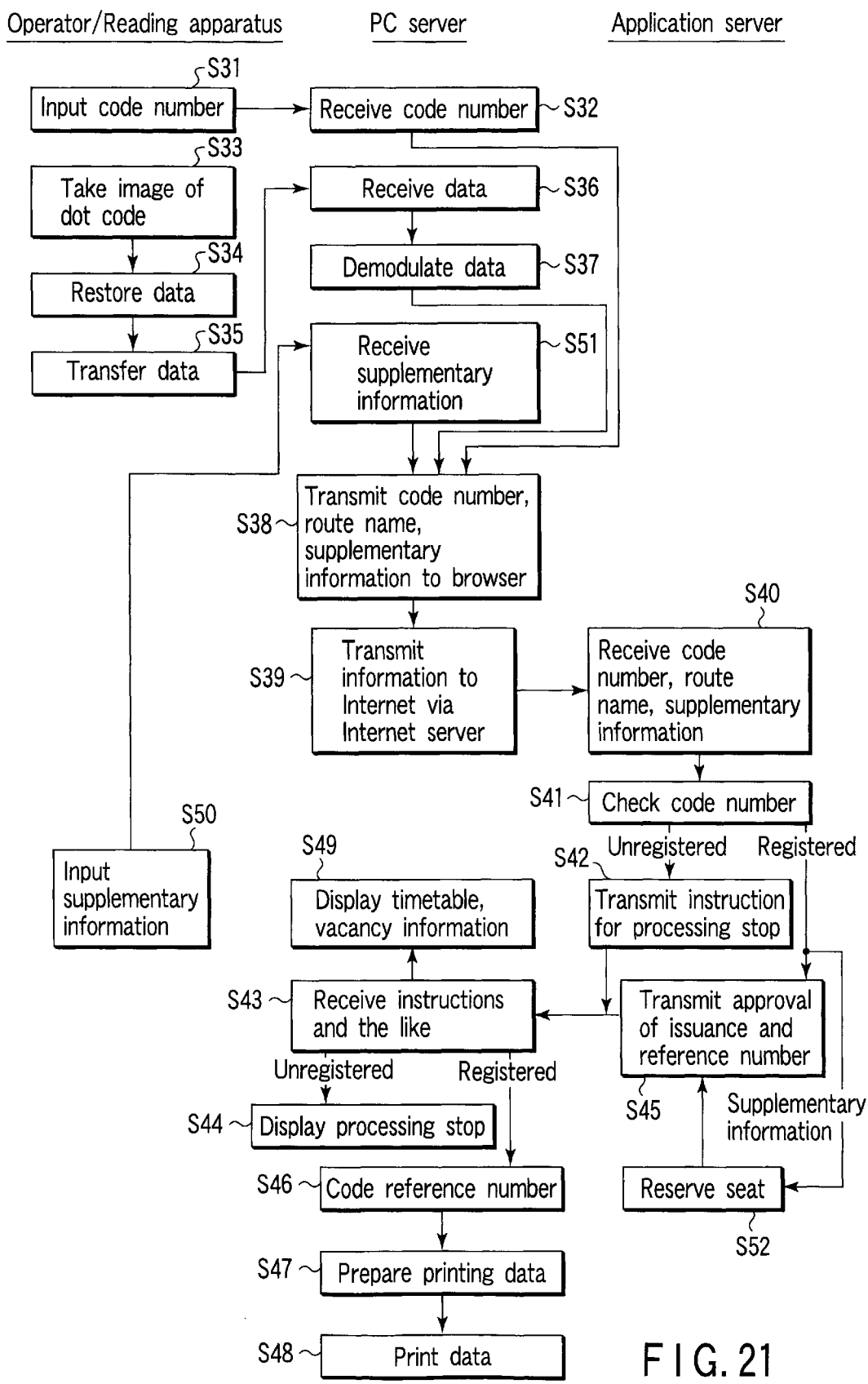
FIG. 21 is an explanatory view of a processing flow in the information presentation system according to the third embodiment.

Operation of the system will next be described with reference to FIG. 21.

Prior to all operations, an operator first inputs a predetermined code number via the PC 20 (steps S31, S32). Subsequently, a route chart of a section requiring the ticket is scanned from the printed material via the reading apparatus 12 (step S33). Then, the PC 20 obtains the railway route ID information of the boarding section in the method described in the second embodiment (steps S34, S35, S36, S37). Subsequently, the code number and ID information are sent to the application server 50 via the Internet server 40 (steps S38, S39, S40).

Subsequently, in the third embodiment, the application server 50 first judges whether the code number is registered or unregistered (step S41). When the number is registered beforehand, the operator is regarded as a normal operator, and the subsequent operation is enabled. When the number is unregistered, this is notified to the PC 20 side (steps S42, S43, S44), and the subsequent operation is not accepted.

On the other hand, when the operator is normally registered, the application server 50 transmits data to be recorded in the dot code 1E printed on the ticket 60 together with notification of approval of printing to the PC 20 (steps S45, S43). The PC 20 prepares a bit image for the actual dot code 1E from the received data to be recorded in the dot code 1E (step S46). The data to be recorded in the dot code 1E includes the aforementioned reference number for preventing illegal use. Moreover, the information to be printed on the ticket 60 except the dot code 1E such as the boarding section information obtained beforehand from the scanned dot code 1, price similarly obtained from the dot code 1 or given from the application server 50, and date obtained from a clock of the PC 20 are prepared (step S47). Subsequently, this information and the bit image of the dot code 1E are printed on a predetermined sheet as the ticket 60 (step S48).

When the ticket 60 issued in this manner is actually used, the dot code 1E on the ticket 60 is read via another code reading apparatus during boarding. Illegal use can be found by judging whether or not the code has the reference number to be written. Moreover, when supplementary information with the reference number is further included in the dot code 1E, illegal use can be effectively prevented by judging whether or not the code has the supplementary information.

Additionally, payment can easily be settled, for example, by performing a procedure for settlement via a credit card during registration.

Moreover, the ticket 60 may be used not as an ordinary ticket, but as a seat designation ticket. That is, in this case, the timetable and vacancy information for the route name are transmitted to the PC 20 from the application server 50, and displayed (step S49), and the operator further inputs the supplementary information such as a desired date, train name, and seat name (step S50). Subsequently, the PC 20 receives the supplementary information (step S51), and transfers the information to the Web browser (step S38). The Web browser transmits the supplementary information to the application server 50 via the Internet server 40 (steps S39, 40). Thereby, the application server 50 reserves a seat in accordance with the received supplementary information (step S52). Moreover, when the information transmitted in step S45 includes the reservation information, the reserved train date, train name, seat name, and the like can be printed on the ticket 60. Moreover, the reserved train date, train name, seat name, and other information can also be include in the dot code 1E.

[Fourth Embodiment]

Additionally, for a method of indicating the railway route, in the first to third embodiments, the ID information is included in the portion corresponding to the railway route of the railway route chart. In a fourth embodiment, for example, station ID information by which station announcement and station name can be designated is printed as the dot code 1 in the station indication portion, and respective stations or necessary two stations may be inputted by scanning.

FIG. 22 schematically shows the route chart. That is, the dot code 1 is printed in the respective station indications 16A, 16B, 16C as shown in FIG. 22. The dot code 1 is recorded, for example, in a 2×2 blocks constitution within a size of the station indication 16A, 16B, or 16C. Of course, only one block may be recorded. In this case, a data amount for the number of blocks is about several hundreds of bytes.

One example of the file format is shown in FIG. 23. The station name may be recorded directly with text data, or coded. For concrete route information, data of route sections on opposite sides of the station may directly be recorded in the dot code. Alternatively, for example, auxiliary data other than the dot code may be stored on the PC side, or a table of necessary information such as the required time and fare may be stored beforehand in the server on the Internet. In this constitution, desired information may be derived.

When information over a plurality of sections is necessary, the dot code 1 of each station indication is read as shown in FIG. 22. Alternatively, only the dot code 1 of the indication of the station of origin, and the dot code 1 of the indication of the terminal station may be read. In consideration of the convenience for use and the data amount to be recorded, it is preferable to scan the start and end points and store data in the portion other than the dot code.

The embodiments of the present invention have been described above, but the present invention is not limited to the embodiments, and can of course be modified or applied variously within the scope of the present invention.

For example, in the aforementioned embodiments, the dot code has been described as the example of the coded image, but other codes having other physical formats may be used.

Moreover, the reading apparatus 12 is not limited to a pen type or a mouse type. For example, the reading apparatus may be formed in a train form and set to be playful.

Here, the present invention is summarized as follows.

(1) A printed material with a railway route chart printed thereon, comprising:
   a portion with the railway route chart printed thereon, including a station indication indicated by at least one of a predetermined symbol and a predetermined pattern, and a railway route indication disposed between the station indications and indicated by at least one of a predetermined symbol and a predetermined pattern; and
   an optically readable coded image printed on either one of the station indication and the railway route indication and obtained by coding and processing a sound about railway.

That is, according to the present invention, since the optically readable coded image obtained by coding/processing the sound about a railway is printed in the station indication or the railway route indication, the sound about the railway can easily be obtained from the printed material only by reading the coded image.

(2) The printed material with the railway route chart printed thereon according to (1) wherein the coded image is constituted to include a different sound for each encoded image disposed in the railway route indication.

That is, according to the present invention, since the coded image is constituted to include the different sound for each coded image disposed in the railway route indication, in addition to the effect of (1), the sound to be recorded can be changed for each line between the stations (division). There can further be provided a printed material with an elaborately designed railway route chart printed thereon.

(3) The printed material with the railway route chart printed thereon according to (2) wherein the coded image is constituted in such a manner that a reading apparatus slides on the printed material to read the coded image by manually scanning the coded image along a railway route direction, and reproduces/outputs the sound about the railway.

That is, according to the present invention, the coded image is constituted in such a manner that the reading apparatus slides on the printed material to read the coded image by manually scanning the coded image along the railway route direction, and reproduces/outputs the sound about the railway. Therefore, in addition to the effect of (2), the reading apparatus is operated as if the train ran on the railway route, and the coded image can be read. Therefore, the present invention can preferably be applied to a toy, and the like.

(4) The printed material with the railway route chart printed thereon according to (3) wherein the coded image is constituted in such a manner that the reading apparatus reproduces/outputs the respective different sounds in accordance with two opposite reading directions as the railway route direction by the reading apparatus.

That is, according to the present invention, the coded image is constituted in such a manner that the reading apparatus reproduces/outputs the respective different sounds in accordance with the two opposite reading directions as the railway route direction by the reading apparatus. Therefore, in addition to the effect of (3), even with the reading of the coded image for one railway route, the different sounds are reproduced/outputted in up train and down train ways. There can further be provided the printed material on which the elaborately designed railway route chart is printed.

(5) The printed material with the railway route chart printed thereon according to (4) wherein the coded image includes at least two sounds for announcing respective names of stations on opposite sides of one railway route.

That is, according to the present invention, the coded image includes at least two sounds for announcing the respective names of the stations on the opposite sides of one railway route. Therefore, in addition to the effect of (4), there can be provided the sound for announcing the name of the station positioned in a reading completion position, when the coded image is completely read in the up train and down train ways for one railway route.

(6) The printed material with the railway route chart printed thereon according to (5) wherein the coded image is constituted in such a manner that the reading apparatus reproduces/outputs the sound for announcing the name of the station reached immediately after the reading apparatus continuously reads a plurality of coded images in one direction.

That is, according to the present invention, the coded image is constituted in such a manner that the reading apparatus reproduces/outputs the sound for announcing the name of the station reached immediately after the reading apparatus continuously reads a plurality of coded images in one direction. Therefore, in addition to the effect of (5), there can be provided the sound for announcing the name of the station in the last reading completion position, even when the reading apparatus is operated like the super express train, skips some stations and continuously reads the coded image. Therefore, the present invention can preferably be utilized in a toy, and the like.

(7) The printed material with the railway route chart printed thereon according to (1) wherein the coded image differs in a printing color with each railway route.

That is, according to the present invention, since the coded image differs in the printing color with each railway route, a plurality of railway routes can be printed/disposed as the respective coded images.

(8) The printed material with the railway route chart printed thereon according to any one of (1) to (7) wherein the coded image is constituted by disposing a plurality of blocks such that the blocks can be adjacent to one another, and each of the blocks is constituted by arranging:
a data dot pattern constituted of a plurality of dots arranged in accordance with the data content of the sound;
a marker for identifying the block; and
a block address pattern indicating an address of the block in a predetermined positional relation.

That is, according to the present invention, the coded image to be preferably printed as the railway route can be obtained.

(9) A printed material with a railway route chart printed thereon, comprising:
a portion with the railway route chart printed thereon, including a station indication indicated by at least one of a predetermined symbol and a predetermined pattern, and a railway route indication disposed between the station indications and indicated by at least one of a predetermined symbol and a predetermined pattern; and
an optically readable coded image printed on either one of the station indication and the railway route indication and obtained by coding and processing information corresponding to either one of a station and a railway route.

That is, according to the present invention, the optically readable coded image obtained by coding/processing the information corresponding to the station or the railway route is printed in the station indication and the railway route indication. Therefore, the information corresponding to the station or the railway route can easily be obtained from the printed material by reading only the coded image.

(10) The printed material with the railway route chart printed thereon according to (9) wherein the information corresponding to the station includes station ID information for specifying the station.

That is, according to the present invention, in addition to the effect of (9), since the information for the station includes the station ID information for specifying the station, the printed material can easily be linked with information processors such as a computer.

(11) The printed material with the railway route chart printed thereon according to (9) wherein the information corresponding to the railway route includes railway route ID information for specifying the railway route.

That is, according to the present invention, in addition to the effect of (9), since the information for the railway route includes the railway route ID information for specifying the railway route, the printed material can easily be linked with the information processors such as the computer.

(12) The printed material with the railway route chart printed thereon according to (9) wherein the information corresponding to the railway route includes at least one of a timetable of a train running on the railway route, a required time of the train running on the railway route, and a fare of the train running on the railway route.

That is, according to the present invention, in addition to the effect of (9), since the information for the railway route includes at least one of the timetable, required time, and fare of the train running on the railway route, detailed indication about the railway route can directly be obtained from the printed material.

(13) The printed material with the railway route chart printed thereon according to (9) wherein the information corresponding to either one of the station and the railway route includes address information for designating an information resource with the information about either one of the station and the railway route stored therein by a predetermined apparatus connected to the reading apparatus for reading the coded image.

That is, according to the present invention, in addition to the effect of (9), the information corresponding to either one of the station and the railway route includes address information for designating an information resource with the information about the station or the railway route stored therein by the predetermined apparatus connected to the reading apparatus for reading the coded image. Therefore, the information resource with the desired information stored therein can directly and securely be designated from the printed material, and operation properties for obtaining the information can further be enhanced.

(14) The printed material with the railway route chart printed thereon according to (13) wherein the predetermined apparatus is an access apparatus, and
the address information includes a uniform resource locator (URL) for the access apparatus to designate and access the information resource on the World Wide Web (WWW), the information resource being connected to the Internet.

That is, according to the present invention, in addition to the effect of (13), since the coded image includes a URL as the address information, the information resource on the World Wide Web connected to the Internet can directly be designated, and the information can easily be obtained from the Internet.

(15) An information presenting method comprising steps of:
optically reading a coded image by a reading apparatus from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of the station indication and the railway route indication and obtained by coding and processing either one of station ID information for specifying a station and railway route ID information for specifying a railway route;
reproducing either one of the station ID information and the railway route ID information from the read coded image;
searching information about either one of the station and the railway route corresponding to either one of the reproduced station ID information and the reproduced railway route ID information from the information resource in which the information about a plurality of stations or the railway route is stored; and
outputting the information about either one of the searched station and the searched railway route.

That is, according to the present invention, when the reading apparatus reads the coded image printed in the station indication or the railway route indication of the printed material in an optically readable manner, the station ID information or the railway route ID information is obtained so that the station or the railway route can be specified. In the information resource, the corresponding information about the station or the railway route is searched based on the station ID information or the railway route ID information, and a search result can be presented to the user. Therefore, the user can easily and securely obtain the desired information.

(16) The information presenting method according to (15) wherein the information resource comprises an information resource on the World Wide Web (WWW), the information resource on the WWW being accessible via the Internet by an access apparatus connected to the reading apparatus.

That is, according to the present invention, in addition to the effect of (15), the user can obtain the information from the information resource on the World Wide Web connected to the Internet.

(17) The information presenting method according to (16) wherein the coded image further comprises a uniform resource locator (URL) for the access apparatus to designate and access the information resource.

That is, according to the present invention, in addition to the effect of (16), since the coded image further includes a URL, the user can directly designate the information resource on the World Wide Web connected to the Internet, and can easily obtain the information via the Internet.

(18) The information presenting method according to (15) wherein the information about the railway route includes at least one of a timetable of a train running on the railway route, a required time of the train running on the railway route, and a fare of the train running on the railway route.

That is, according to the present invention, in addition to the effect of (15), the user can easily obtain at least one of the timetable, required time, and fare of the train running on the railway route.

(19) An information presentation system comprising:

a reader for optically reading a coded image from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of the station indication and the railway route indication and obtained by coding and processing either one of station ID information for specifying a station and railway route ID information for specifying a railway route;

a reproducer for reproducing either one of the station ID information and the railway route ID information from the coded image read by the reader;

an information resource for storing information about a plurality of stations and the railway route;

a searcher for searching information about either one of the station and the railway route corresponding to either one of the station ID information and the railway route ID information reproduced by the reproducer from the information resource; and an output section for outputting the information about the station and the railway route searched by the searcher.

That is, according to the present invention, when the reader reads the coded image printed in the station indication or the railway route indication of the printed material in the optically readable manner, the station ID information or the railway route ID information is obtained so that the station or the railway route can be specified. In the information resource, the corresponding information about the station or the railway route is searched based on the station ID information or the railway route ID information, and the search result can be presented to the user. Therefore, the user can easily and securely obtain the desired information.

(20) The information presentation system according to (19) wherein the information resource comprises an information resource on the World Wide Web (WWW), the information resource on the WWW being accessible via the Internet by an access apparatus connected to the reader.

That is, according to the present invention, in addition to the effect of (19), the user can obtain the information from the information resource on the World Wide Web connected to the Internet.

(21) The information presentation system according to (20) wherein the coded image further comprises a uniform resource locator (URL) for the access apparatus to designate and access the information resource.

That is, according to the present invention, in addition to the effect of (20), since the coded image further includes a URL, the user can directly designate the information resource on the World Wide Web connected to the Internet, and can easily obtain the information via the Internet.

(22) The information presentation system according to (19) wherein the information about the railway route includes at least one of a timetable of a train running on the railway route, a required time of the train running on the railway route, and a fare of the train running on the railway route.

That is, according to the present invention, in addition to the effect of (19), the user can easily obtain at least one of the timetable, required time, and fare of the train running on the railway route.

(23) An information resource comprising:

a searcher for searching information about either one of a station and a railway route corresponding to either one of station ID information and railway route ID information from information about a plurality of stations and the railway route, when a reading apparatus optically reads a coded image from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of the station indication and the railway route indication and obtained by coding and processing either one of the station ID information for specifying the station and the railway route ID information for specifying the railway route, and either one of the station ID information and the railway route ID information is reproduced from the read coded image; and an output section for outputting the searched information about either one of the station and the railway route.

That is, according to the present invention, when the reading apparatus reads the coded image printed in the station indication or the railway route indication of the printed material in the optically readable manner, the station ID information or the railway route ID information is obtained so that the station or the railway route can be specified. The corresponding information about the station or the railway route is searched based on the station ID information or the railway route ID information, and the search result can be presented to the user. Therefore, the user can easily and securely obtain the desired information.

(24) The information resource according to (23) wherein the information resource comprises an information resource on the World Wide Web (WWW), the information resource on the WWW being accessible via the Internet by an access apparatus connected to the reading apparatus.

That is, according to the present invention, in addition to the effect of (23), the user can obtain the information from the information resource on the World Wide Web connected to the Internet.

(25) The information resource according to (24) wherein the coded image further comprises a uniform resource locator (URL) for the access apparatus to designate and access the information resource.

That is, according to the present invention, in addition to the effect of (24), since the coded image further includes a URL, the user can directly designate the information resource on the World Wide Web connected to the Internet, and can easily obtain the information via the Internet.

(26) The information resource according to (23) wherein the information about the railway route includes at least one of a timetable of a train running on the railway route, a required time of the train running on the railway route, and a fare of the train running on the railway route.

That is, according to the present invention, in addition to the effect of (23), the user can easily obtain at least one of the timetable, required time, and fare of the train running on the railway route.

(27) A ticket issuing method comprising steps of:
optically reading a coded image by a reading apparatus from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of the station indication and the railway route indication and obtained by coding and processing either one of station ID information for specifying a station and railway route ID information for specifying a railway route;
reproducing either one of the station ID information and the railway route ID information from the read coded image; and
issuing a train ticket based on information about either one of the station an the railway route corresponding to either one of the reproduced station ID information and the reproduced railway route ID information.

That is, according to the present invention, when the reading apparatus reads the coded image printed in the station indication or the railway route indication of the printed material in the optically readable manner, the station ID information or the railway route ID information is obtained so that the station or the railway route can be specified. The train ticket can easily and securely be issued based on the station ID information or the railway route ID information.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A printed material with a railway route chart printed thereon, comprising:
a portion with said railway route chart printed thereon, including a station indication indicated by at least one of a predetermined symbol and a predetermined pattern, and a railway route indication disposed between the station indications and indicated by at least one of a predetermined symbol and a predetermined pattern; and
an optically readable coded image printed on either one of said station indication and said railway route indication and obtained by coding and processing a sound about railway.

2. The printed material with the railway route chart printed thereon according to claim 1, wherein said coded image is constituted to include a different sound for each encoded image disposed in said railway route indication.

3. The printed material with the railway route chart printed thereon according to claim 2, wherein said coded image is constituted in such a manner that a reading apparatus slides on said printed material to read the coded image by manually scanning the coded image along a railway route direction, and reproduces/outputs said sound about the railway.

4. The printed material with the railway route chart printed thereon according to claim 3, wherein said coded image is constituted in such a manner that said reading apparatus reproduces/outputs the respective different sounds in accordance with two opposite reading directions as said railway route direction by said reading apparatus.

5. The printed material with the railway route chart printed thereon according to claim 4, wherein said coded image includes at least two sounds for announcing respective names of stations on opposite sides of one railway route.

6. The printed material with the railway route chart printed thereon according to claim 5, wherein said coded image is constituted in such a manner that the reading apparatus reproduces/outputs the sound for announcing the name of the station reached immediately after said reading apparatus continuously reads a plurality of coded images in one direction.

7. The printed material with the railway route chart printed thereon according to claim 1, wherein said coded image differs in a printing color with each railway route.

8. The printed material with the railway route chart printed thereon according to claim 1, wherein said coded image is constituted by disposing a plurality of blocks such that the blocks can be adjacent to one another, and
each of said blocks is constituted by arranging:
a data dot pattern constituted of a plurality of dots arranged in accordance with the data content of said sound;
a marker for identifying said block; and
a block address pattern indicating an address of said block in a predetermined positional relation.

9. A printed material with a railway route chart printed thereon, comprising:
a portion with said railway route chart printed thereon, including a station indication indicated by at least one of a predetermined symbol and a predetermined pattern, and a railway route indication disposed between the station indications and indicated by at least one of a predetermined symbol and a predetermined pattern; and
an optically readable coded image printed on either one of said station indication and said railway route indication and obtained by coding and processing information corresponding to either one of a station and a railway route.

10. The printed material with the railway route chart printed thereon according to claim 9, wherein said information corresponding to the station includes station ID information for specifying the station.

11. The printed material with the railway route chart printed thereon according to claim 9, wherein said information corresponding to the railway route includes railway route ID information for specifying the railway route.

12. The printed material with the railway route chart printed thereon according to claim 9, wherein said information corresponding to the railway route includes at least one of a timetable of a train running on the railway route, a required time of the train running on the railway route, and a fare of the train running on the railway route.

13. The printed material with the railway route chart printed thereon according to claim 9, wherein said information corresponding to either one of the station and the railway route includes address information for designating an information resource with the information about either one of the station and the railway route stored therein by a predetermined apparatus connected to said reading apparatus for reading the coded image.

14. The printed material with the railway route chart printed thereon according to claim 13, wherein said predetermined apparatus is an access apparatus, and said address information includes a uniform resource locator (URL) for said access apparatus to designate and access said information resource on the World Wide Web (WWW), said information resource being connected to the Internet.

15. An information presenting method comprising steps of:

optically reading a coded image by a reading apparatus from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of said station indication and said railway route indication and obtained by coding and processing either one of station ID information for specifying a station and railway route ID information for specifying a railway route;

reproducing either one of said station ID information and said railway route ID information from the read coded image;

searching information about either one of the station and the railway route corresponding to either one of said reproduced station ID information and the reproduced railway route ID information from the information resource in which the information about a plurality of stations or the railway route is stored; and outputting the information about either one of the searched station and the searched railway route.

16. The information presenting method according to claim 15, wherein said information resource comprises an information resource on the World Wide Web (WWW), said information resource on the WWW being accessible via the Internet by an access apparatus connected to said reading apparatus.

17. The information presenting method according to claim 16, wherein said coded image further comprises a uniform resource locator (URL) for said access apparatus to designate and access said information resource.

18. The information presenting method according to claim 15, wherein said information about the railway route includes at least one of a timetable of a train running on the railway route, a required time of the train running on the railway route, and a fare of the train running on the railway route.

19. An information presentation system comprising:

a reader for optically reading a coded image from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of said station indication and said railway route indication and obtained by coding and processing either one of station ID information for specifying a station and railway route ID information for specifying a railway route;

a reproducer for reproducing either one of said station ID information and said railway route ID information from the coded image read by said reader;

an information resource for storing information about a plurality of stations and the railway route;

a searcher for searching information about either one of the station and the railway route corresponding to either one of said station ID information and the railway route ID information reproduced by said reproducer from said information resource; and an output section for outputting the information about said station and the railway route searched by said searcher.

20. The information presentation system according to claim 19, wherein said information resource comprises an information resource on the World Wide Web (WWW), said information resource on the WWW being accessible via the Internet by an access apparatus connected to said reader.

21. The information presentation system according to claim 20, wherein said coded image further comprises a uniform resource locator (URL) for the access apparatus to designate and access the information resource.

22. The information presentation system according to claim 19, wherein said information about the railway route includes at least one of a timetable of a train running on the railway route, a required time of the train running on the railway route, and a fare of the train running on the railway route.

23. An information resource comprising:

a searcher for searching information about either one of a station and a railway route corresponding to either one of station ID information and railway route ID information from information about a plurality of stations and the railway route, when a reading apparatus optically reads a coded image from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of said station indication and said railway route indication and obtained by coding and processing either one of the station ID information for specifying the station and the railway route ID information for specifying the railway route, and either one of said station ID information and said railway route ID information is reproduced from the read coded image; and an output section for outputting the searched information about either one of the station and the railway route.

24. The information resource according to claim 23, wherein the information resource comprises an information resource on the World Wide Web (WWW), said information resource on the WWW being accessible via the Internet by an access apparatus connected to said reading apparatus.

25. The information resource according to claim 24, wherein said coded image further comprises a uniform resource locator (URL) for the access apparatus to designate and access said information resource.

26. The information resource according to claim 23, wherein said information about the railway route includes at least one of a timetable of a train running on the railway route, a required time of the train running on the railway route, and a fare of the train running on the railway route.

27. A ticket issuing method comprising steps of:

optically reading a coded image by a reading apparatus from a printed material comprising a railway route chart including a station indication indicated by at least one of a predetermined symbol and a predetermined pattern, and a railway route indication disposed between the station indications and indicated by at least one of a predetermined symbol and a predetermined pattern, and the optically readable coded image printed on either one of said station indication and said railway route indication and obtained by coding and processing either one of station ID information for specifying a station and railway route ID information for specifying a railway route;

reproducing either one of said station ID information and said railway route ID information from the read coded image; and issuing a train ticket based on information about either one of the station an the railway route corresponding to either one of said reproduced station ID information and the reproduced railway route ID information.

* * * * *